(12) United States Patent
Park et al.

(10) Patent No.: US 12,491,925 B2
(45) Date of Patent: Dec. 9, 2025

(54) STEERING DEVICE OF VEHICLE

(71) Applicant: HL MANDO CORPORATION, Pyeongtaek-si (KR)

(72) Inventors: Sangmook Park, Bucheon-si (KR); Hanbin Cho, Seoul-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/384,777

(22) Filed: Oct. 27, 2023

(65) Prior Publication Data

US 2024/0343292 A1  Oct. 17, 2024

(30) Foreign Application Priority Data

Apr. 13, 2023  (KR) ......................... 10-2023-0049018

(51) Int. Cl.
*B62D 1/185* (2006.01)
*B62D 1/184* (2006.01)

(52) U.S. Cl.
CPC ............. *B62D 1/185* (2013.01); *B62D 1/184* (2013.01)

(58) Field of Classification Search
CPC ........ B62D 1/185; B62D 1/184; B62D 1/192; B62D 1/195; B60Y 2400/70; B60Y 2400/83
See application file for complete search history.

(56) References Cited

U.S. PATENT DOCUMENTS

| | | | | |
|---|---|---|---|---|
| 10,220,872 B2 * | 3/2019 | Yoshihara | ............... | B62D 1/184 |
| 10,343,707 B2 * | 7/2019 | Kreutz | ................... | B62D 1/184 |
| 2008/0236325 A1 * | 10/2008 | Ridgway | ................ | B62D 1/184 |
| | | | | 74/493 |
| 2010/0300236 A1 * | 12/2010 | Goulay | .................. | B62D 1/184 |
| | | | | 74/493 |
| 2010/0300238 A1 * | 12/2010 | Ridgway | ................ | B62D 1/192 |
| | | | | 74/493 |
| 2011/0185839 A1 * | 8/2011 | Inoue | ..................... | B62D 1/184 |
| | | | | 74/493 |

(Continued)

FOREIGN PATENT DOCUMENTS

| | | |
|---|---|---|
| DE | 10 2016 214 709 A1 | 2/2018 |
| DE | 10 2020 203 038 A1 | 9/2021 |

(Continued)

OTHER PUBLICATIONS

German Office Action issued on Mar. 11, 2025, in connection with the German Patent Application No. 102023130158.6, with its English translation, 16 pages.

(Continued)

*Primary Examiner* — James A English

(74) *Attorney, Agent, or Firm* — Hauptman Ham, LLP

(57) ABSTRACT

A steering device of a vehicle includes an upper tube, a first gear fixed to the upper tube, a lower tube receiving the upper tube, a second gear axially supported on the lower tube, and a locking part moving the second gear up or down to engage the second gear with the first gear or disengage the second gear from the first gear. It is possible to provide an advantage in terms of a high load thanks to increased support against an axial external force and allow for stable engagement between gear teeth, enhanced noise and dust-proof performance, and an enhanced sense of lever manipulation.

19 Claims, 12 Drawing Sheets

(56) References Cited

U.S. PATENT DOCUMENTS

| | | | | |
|---|---|---|---|---|
| 2016/0288817 A1* | 10/2016 | Myohoji | ................ | B62D 1/185 |
| 2016/0288820 A1* | 10/2016 | Myohoji | ................ | B62D 1/184 |
| 2017/0240199 A1* | 8/2017 | Nagatani | ................ | B62D 1/195 |
| 2019/0111961 A1 | 4/2019 | Dite | | |
| 2019/0152507 A1* | 5/2019 | Shiroishi | ................ | B62D 1/184 |
| 2021/0253155 A1* | 8/2021 | Imagaki | ................ | B62D 1/192 |
| 2022/0048555 A1* | 2/2022 | Park | ................ | B62D 1/195 |
| 2024/0043059 A1* | 2/2024 | Heo | ................ | B62D 1/184 |

FOREIGN PATENT DOCUMENTS

| | | |
|---|---|---|
| DE | 11 2019 006 212 T5 | 9/2021 |
| DE | 11 2020 004 248 T5 | 6/2022 |
| JP | 2019-93739 A | 6/2019 |
| KR | 10-2018-0070820 A | 6/2018 |
| KR | 10-2019-0090975 A | 8/2019 |
| KR | 20210030577 A * | 3/2021 |
| KR | 10-2517943 B1 | 4/2023 |

OTHER PUBLICATIONS

Office Action issued on Sep. 8, 2025, for corresponding Korean Patent Application No. 10-2023-0049018, along with an English machine translation (20 pages).

\* cited by examiner

STEERING DEVICE OF VEHICLE

CROSS-REFERENCE TO RELATED APPLICATION

The present application claims the benefit of priority to Korean Patent Application No. 10-2023-0049018, filed on Apr. 13, 2023 in the Korean Intellectual Property Office, the disclosure of which is hereby incorporated by reference for all purposes as if fully set forth herein.

TECHNICAL FIELD

The present disclosure relates to a steering device of a vehicle and, more specifically, to a steering device of a vehicle which is advantageous for a high load thanks to increased support against an axial external force and allows for stable engagement between gear teeth, enhanced noise and dust-proof performance, easier tuning for the lever manipulation angle, and an enhanced sense of lever manipulation.

BACKGROUND

Typically, a vehicle steering column includes a telescoping function. The telescoping function allows the driver to adjust the protrusion of the steering wheel to fit his or her height or body shape, enabling smooth manipulation.

In the manual-type steering column, the telescoping of the steering column is locked or unlocked by the driver's lever manipulation. Typically, the lower tube and the upper tube have gears that may mesh with each other. In the unlocked state according to the lever manipulation, the two gears are spaced apart from each other to allow the driver to adjust the axial position of the upper tube and, in the locked state, the two gears are engaged with each other to be axially fixed to the upper tube and the lower tube.

However, if the lever is manipulated to be locked when the gear teeth are positioned out of engagement, the teeth of the gears fail to properly mesh with each other, leading to instability that causes the position of the steering shaft not to be fixed.

Further, if the gears are not precisely engaged, the collapsing of the steering column to absorb external shocks may not properly work, failing to ensure the driver's safety. In general, the conventional steering column has a structure in which the gears are rotated to mesh with each other together with the bolt that is rotated by lever manipulation. The conventional structure ends up with an increased width in gear teeth for gear engagement, reducing the number of gear teeth that may mesh, with the result of a disadvantage in terms of loads. Further, as the gear teeth are engaged in order from the gear teeth adjacent to the rotation central axis when the gears are engaged, a sense of being stuck may occur upon locking.

In the conventional steering column, the external force applied to the upper tube is transferred to the bolt coupled with the lever when collapsing is performed. At this time, the bolt which has weak rigidity may be deformed, leading to a failure in stable absorption of loads by the steering column.

The information disclosed in the Background section above is to aid in the understanding of the background of the present disclosure, and should not be taken as acknowledgement that this information forms any part of prior art.

SUMMARY

Conceived in the foregoing background, various embodiments of the present disclosure relate to a steering device of a vehicle which is advantageous for a high load thanks to increased support against an axial external force and allows for stable engagement between gear teeth, enhanced noise and dust-proof performance, and an enhanced sense of lever manipulation.

According to one exemplary embodiment of the present disclosure, there may be provided a steering device of a vehicle comprising an upper tube, a first gear fixed to the upper tube, a lower tube receiving the upper tube, a second gear axially supported on the lower tube, and a locking part moving up or down the second gear to engage the second gear with the first gear or disengage the second gear from the first gear.

According to one exemplary embodiment of the present disclosure, there may be provided a steering device of a vehicle comprising an upper tube, a first gear fixed to the upper tube, a lower tube receiving the upper tube and having a distance bracket, a second gear axially supported on the lower tube, and a locking part including a lever, a bolt coupled with the lever and passing through the distance bracket, and a swing cam having a first end coupled to the bolt and a second end overlapping at least a portion of the second gear in a direction in which the second gear moves up.

According to the various embodiments of the present disclosure, it is possible to provide an advantage in terms of a high load thanks to increased support against an axial external force and allow for stable engagement between gear teeth, enhanced noise and dust-proof performance, and an enhanced sense of lever manipulation.

The apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF DRAWINGS

The above and other objects, features, and advantages of the disclosure will be more clearly understood from the following detailed description, taken in conjunction with the accompanying drawings, in which.

Figure 1:
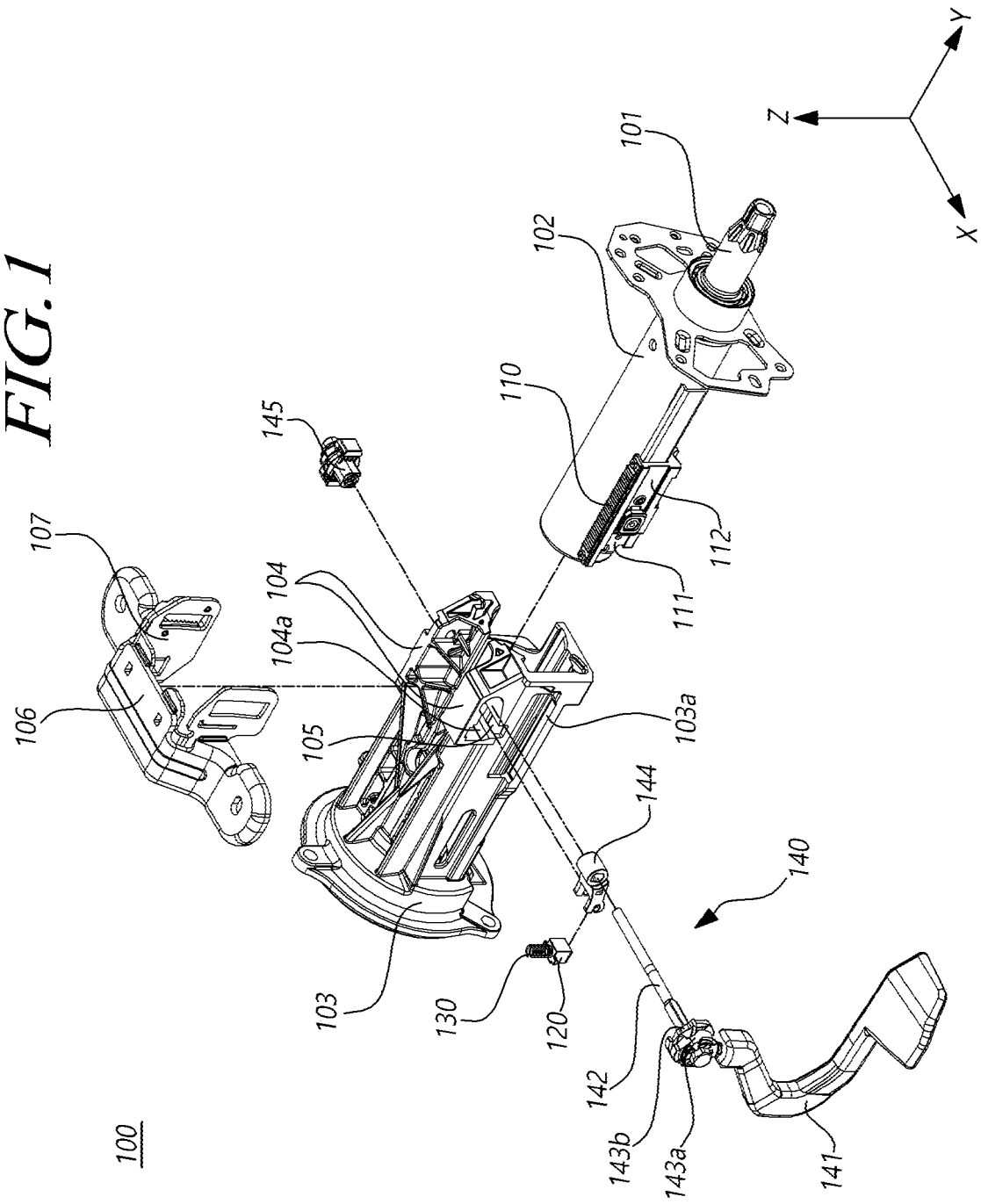
FIG. 1 is an exploded perspective view illustrating a steering column of a vehicle according to one exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

Figure 2:
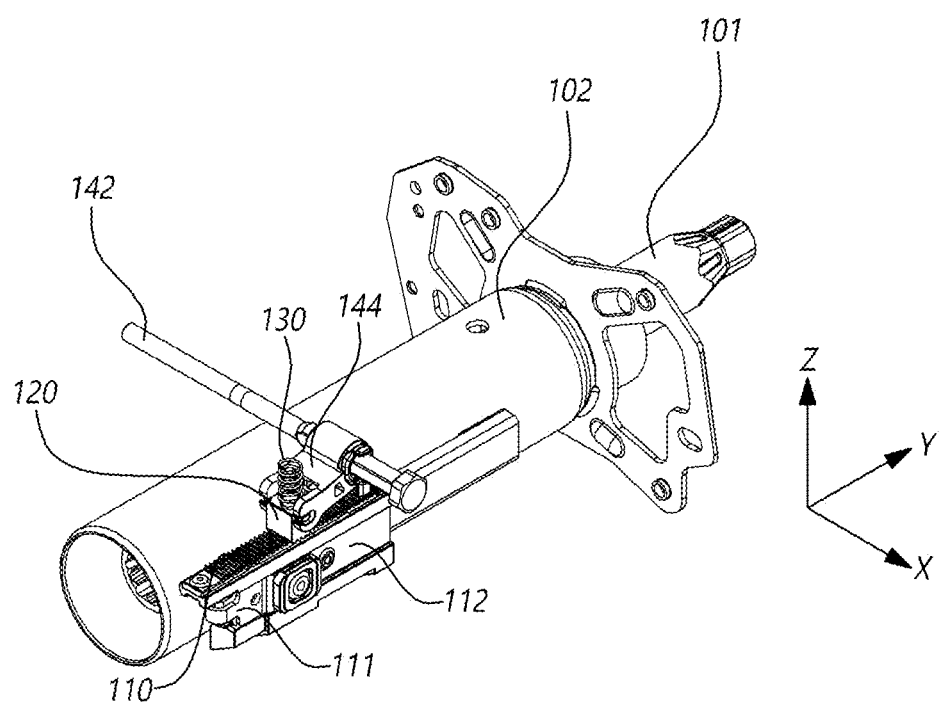
FIG. 2 is a perspective view illustrating a portion of a steering device of a vehicle according to one exemplary embodiment of the present disclosure.
Figure 3A:
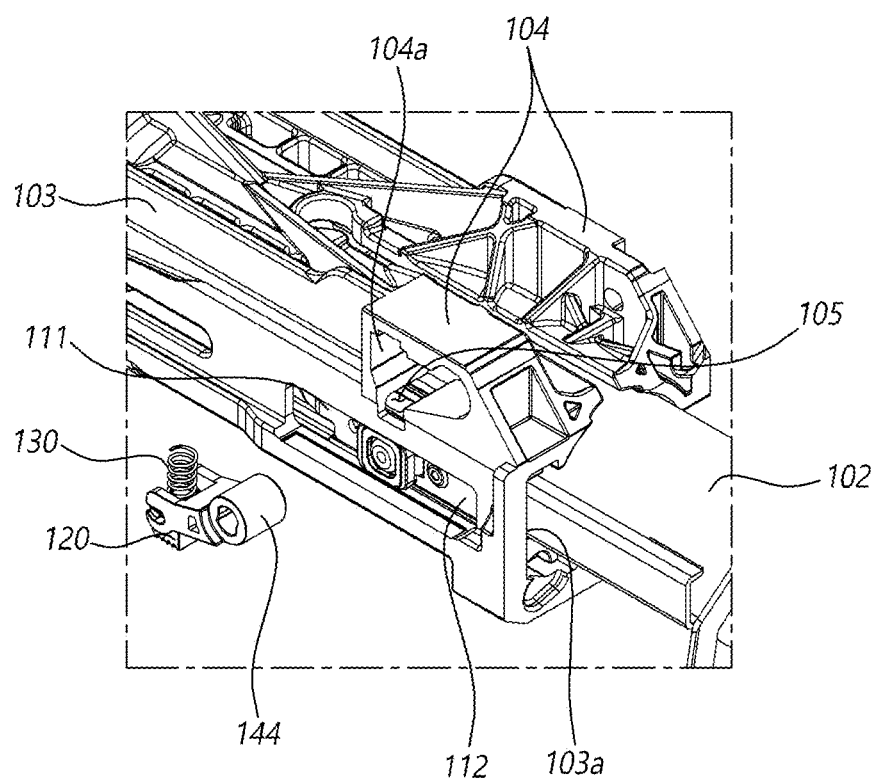
FIGS. 3A and 3B are perspective views illustrating a portion of a steering device of a vehicle according to one exemplary embodiment of the present disclosure.
Figure 3B:
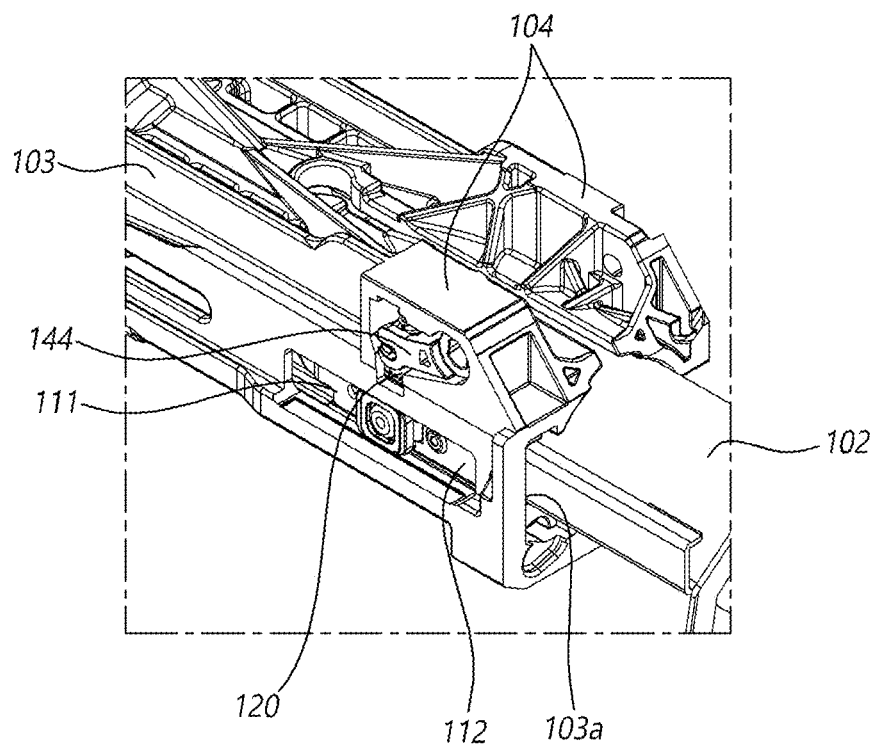
Figure 4:
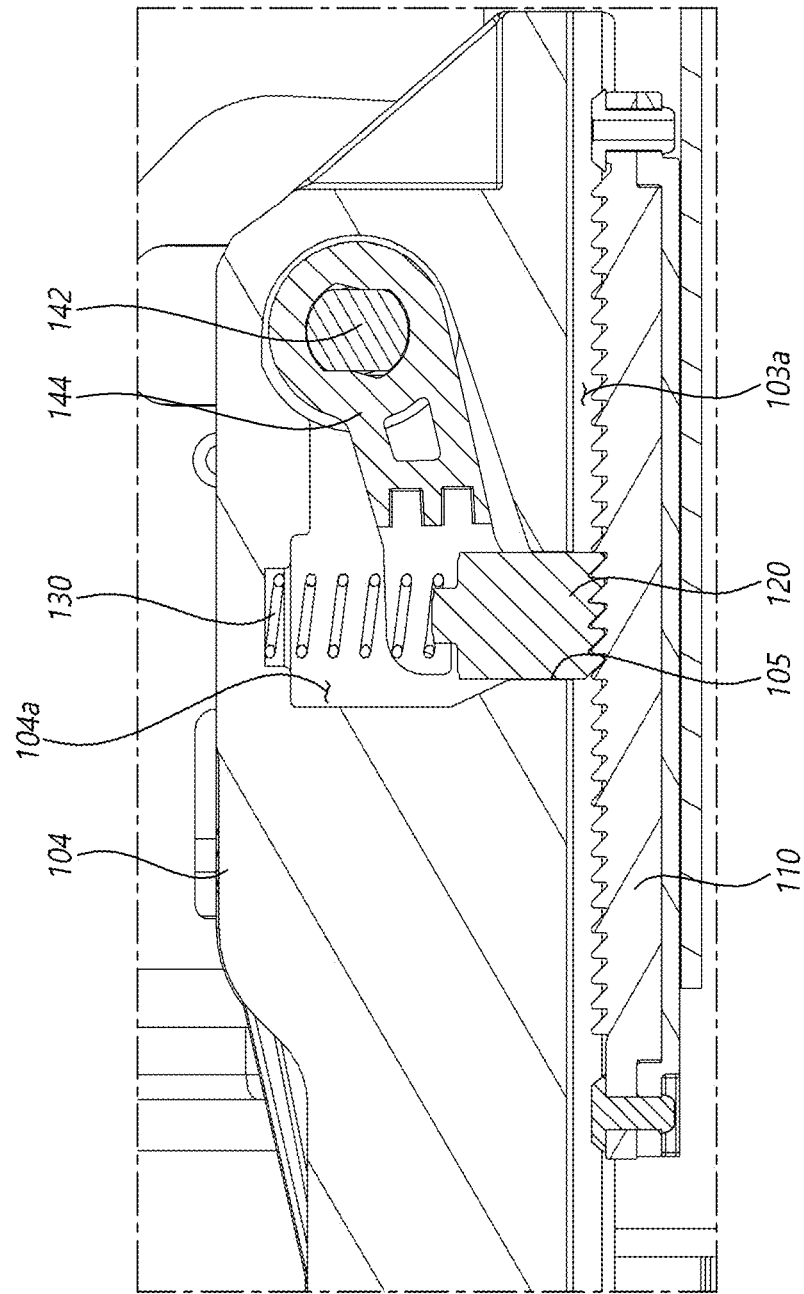
FIG. 4 is a cross-sectional view illustrating a portion of a steering device of a vehicle according to one exemplary embodiment of the present disclosure.
Figure 5:
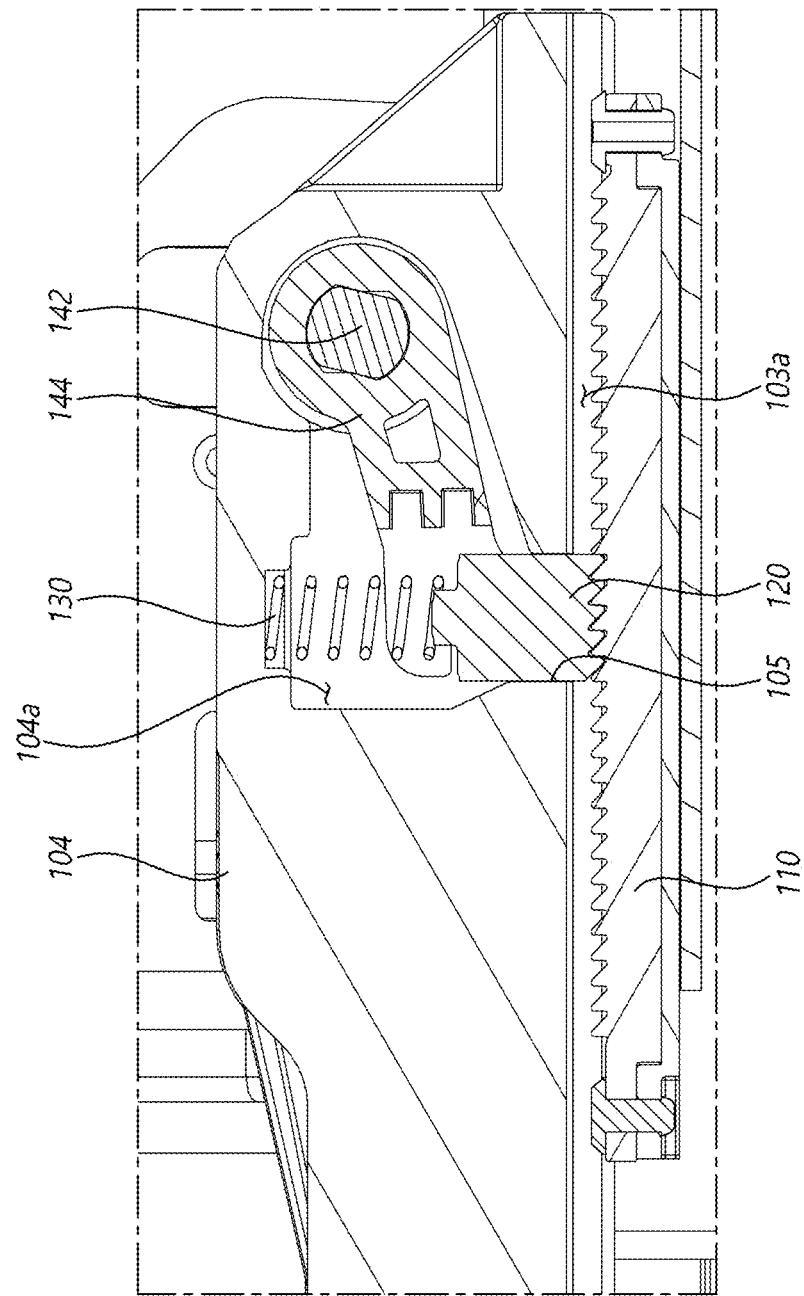
FIG. 5 is a cross-sectional view illustrating an operational state of a steering device of a vehicle according to one exemplary embodiment of the present disclosure.
Figure 6:
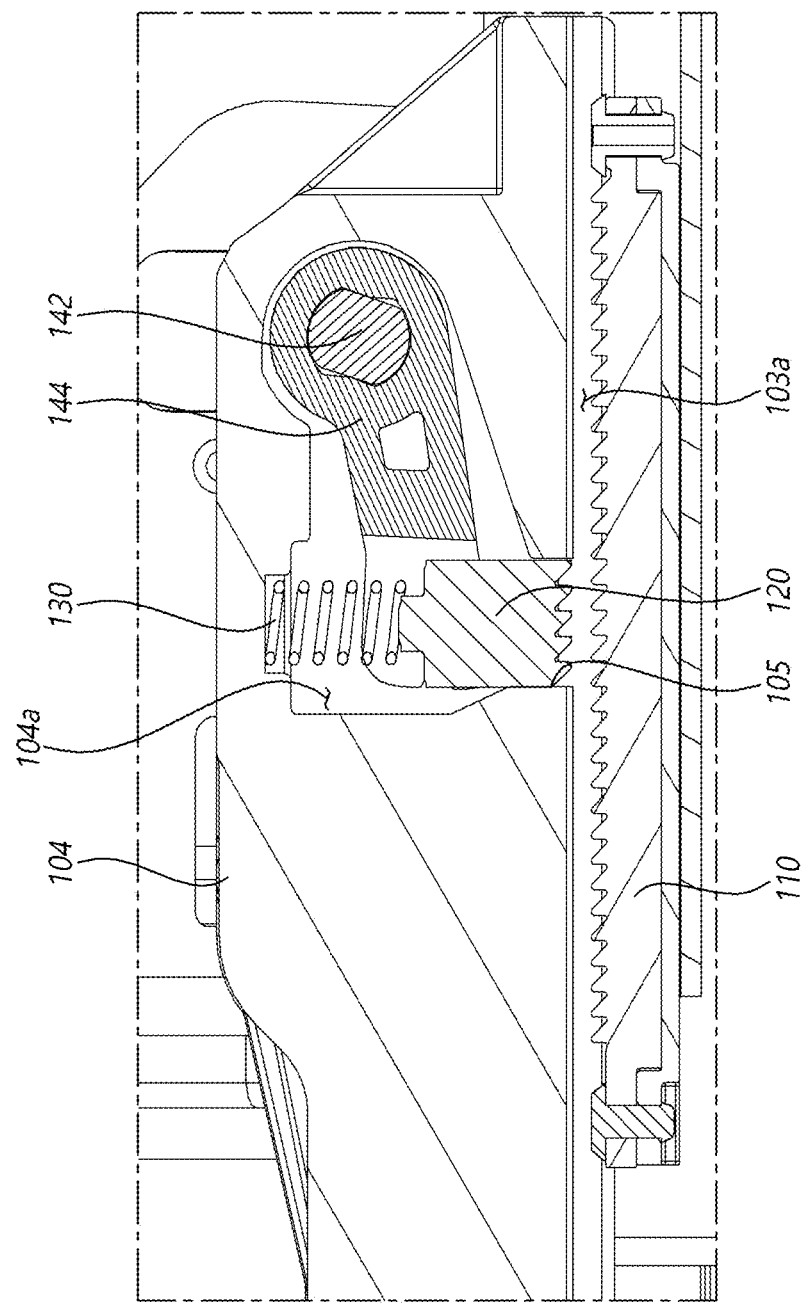
FIG. 6 is a cross-sectional view illustrating an operational state of a steering device of a vehicle according to one exemplary embodiment of the present disclosure.
Figure 7A:
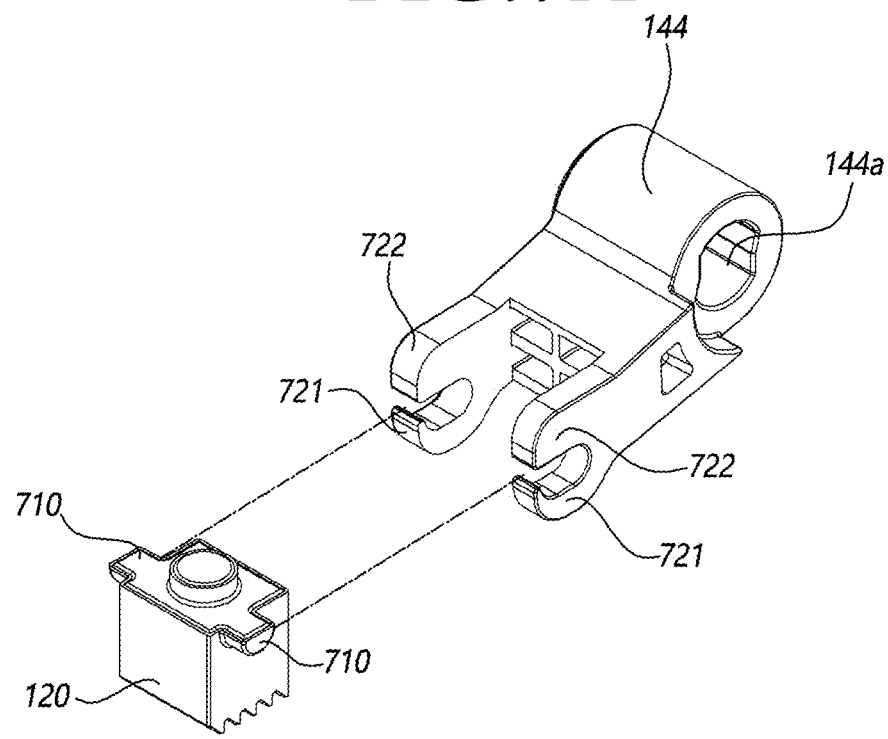
FIGS. 7A and 7B are a perspective view and a side view illustrating a portion of a steering device of a vehicle according to one exemplary embodiment of the present disclosure.
Figure 7B:
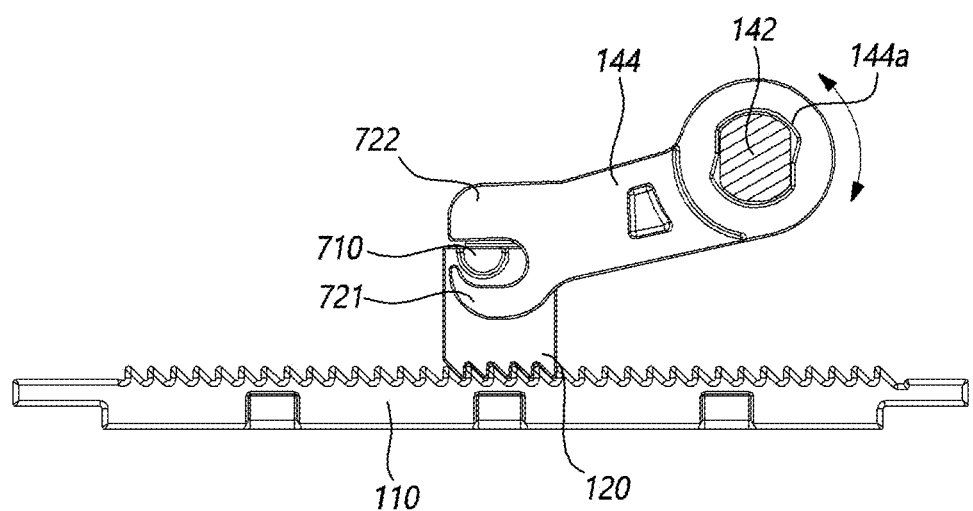
Figure 8:
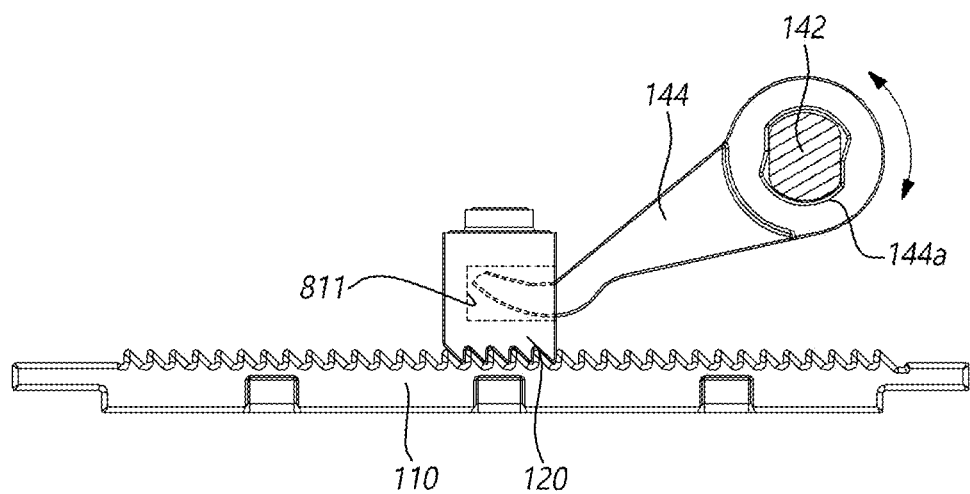
FIG. 8 is a side view illustrating a portion of a steering device of a vehicle according to one exemplary embodiment of the present disclosure.
Figure 9A:
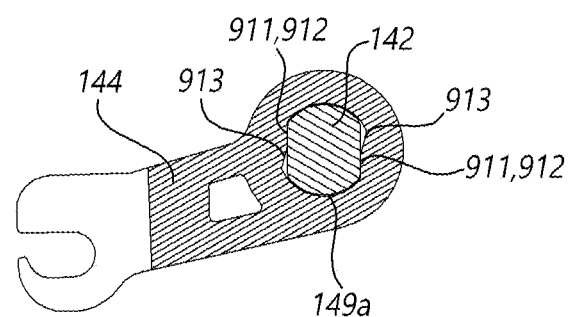
FIGS. 9A, 9B, and 9C are cross-sectional views illustrating a portion of a steering device of a vehicle according to one exemplary embodiment of the present disclosure.
Figure 9B:
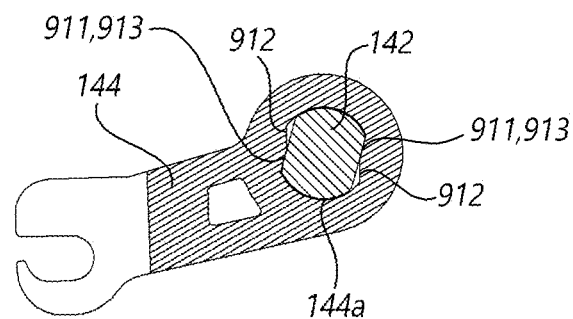
Figure 9C:
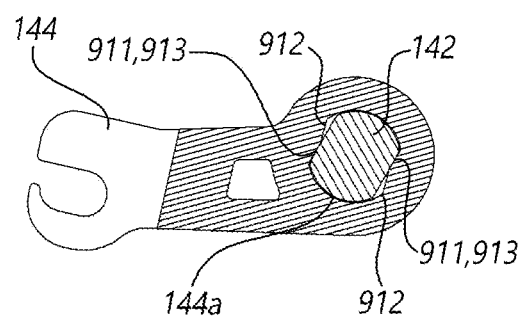

FIG. 1 is an exploded perspective view illustrating a steering column of a vehicle according to one exemplary embodiment of the present disclosure. FIG. 2 is a perspective view illustrating a portion of a steering device of a vehicle according to one exemplary embodiment of the present disclosure. FIGS. 3A and 3B are perspective views illustrating a portion of a steering device of a vehicle according to one exemplary embodiment of the present disclosure. FIG. 4 is a cross-sectional view illustrating a portion of a steering device of a vehicle according to one exemplary embodiment of the present disclosure. FIG. 5 is a cross-sectional view illustrating an operational state of a steering device of a vehicle according to one exemplary embodiment of the present disclosure. FIG. 6 is a cross-sectional view illustrating an operational state of a steering device of a vehicle according to one exemplary embodiment of the present disclosure. FIGS. 7A and 7B are a perspective view and a side view illustrating a portion of a steering device of a vehicle according to one exemplary embodiment of the present disclosure. FIG. 8 is a side view illustrating a portion of a steering device of a vehicle according to one exemplary embodiment of the present disclosure. FIGS. 9A, 9B, and 9C are cross-sectional views illustrating a portion of a steering device of a vehicle according to one exemplary embodiment of the present disclosure.

A steering device 100 of a vehicle according to one exemplary embodiment of the present disclosure includes an upper tube 102, a first gear 110 fixed to the upper tube 102, a lower tube 103 receiving the upper tube 102, a second gear 120 axially supported on the lower tube 103, and a locking part 140 moving up or down the second gear 120 to engage the second gear 120 with the first gear 110 or disengage the second gear 120 from the first gear 110.

The locking part 140 includes a lever 141, a bolt 142, a movable cam 143a, and a fixed cam 143b. The bolt 142 passes through a distance bracket 104 and a plate bracket 107. The fixed cam 143b is coupled to the plate bracket 107 and fixed in a rotational direction, and the movable cam 143a is rotated by manipulation of the lever 141. By the relative rotation of the fixed cam 143b and the movable cam 143a according to manipulation of the lever 141, the bolt 142 is moved in the axial direction of the bolt 142. As the bolt 142 moves in the axial direction of the bolt 142, the clamping force provided by the lower tube 103 to the upper tube 102 increases or decreases, and the fixed gear and the movable gear 145 are engaged or disengaged. If the fixed gear and the movable gear 145 are engaged, the steering column is fixed in a tilting direction. The lower tube 103 is fixed to the vehicle body by a mounting bracket 106.

Referring to FIGS. 1 to 4, a steering device 100 of a vehicle according to one exemplary embodiment of the present disclosure includes an upper tube 102, a first gear 110, a lower tube 103, a second gear 120, and a locking part 140. The upper tube 102 receiving a steering shaft 101 is received in the lower tube 103, and is fixed in the axial direction with respect to the lower tube 103 in the locked state, and is movable in the axial direction with respect to the lower tube 103 in the unlocked state.

The locking part 140 is manipulated by the driver's manipulation of the lever 141, and the steering column is switched to the locked state or the unlocked state. The first gear 110 is fixed to the upper tube 102 in the axial direction, and the second gear 120 is fixed to the lower tube 103 in the axial direction. If the locking part 140 is manipulated in the locked state, the first gear 110 and the second gear 120 are engaged to fix the upper tube 102 in the axial direction with respect to the lower tube 103. If manipulated in the unlocked state, the first gear 110 and the second gear 120 are disengaged, and the upper tube 102 may move axially with respect to the lower tube 103.

The second gear 120 is moved up or down by the locking part 140, and the first gear 110 and the second gear 120 are engaged with or disengaged from each other. In other words, in a state in which the first gear 110 and the second gear 120 are engaged with each other, the locking part 140 may move the second gear 120 up to disengage the second gear 120 from the first gear 110, or move the second gear 120 down to engage the second gear 120 with the first gear 110.

The second gear 120 may be moved down in a first direction perpendicular to the axial direction and facing the first gear 110, or may be moved up in a second direction opposite to the first direction. The second gear 120 is moved down in the first direction (−z direction in FIGS. 1 and 2) perpendicular to the axial direction to engage with the first gear 110 or may be moved up in the second direction (+z direction in FIGS. 1 and 2) perpendicular to the axial direction to disengage from the first gear 110. As is described below in detail, the second gear 120 is moved up or down when the bolt 142 is rotated by manipulation of the lever 141 by the swing cam 144 coupled to the bolt 142 of the locking part 140.

A conventional steering column has a structure in which a movable gear coupled to a bolt rotates about the axis of the bolt and is engaged with or disengaged from a fixed gear fixed to an upper tube. Such a rotary teeth-engaged structure has weak teeth-engagement due to the large width between gear teeth and a reduced number of gear teeth for smooth teeth engagement. However, according to one exemplary embodiment of the present disclosure, since the second gear 120 is vertically moved up or down and engaged with the first gear 110, the gap between gear teeth may be further narrowed and the number of gears to be engaged may be increased, providing strong teeth engagement and an advantage in light of high loads. For example, as compared with the conventional structure, it is possible to reduce the inter-gear teeth gap from, for example, 5 mm to 2 mm while increasing the number of gear teeth from, for example, three to five.

As the conventional steering column adopts the above-described rotary teeth-engagement structure, the movable gear is engaged to the gear teeth of the fixed gear from the gear teeth adjacent to the rotational axis of the movable gear when the two gears are engaged. When the two gears are disengaged, the movable gear is disengaged from the gear teeth of the fixed gear from the gear teeth spaced farther apart from the rotational axis of the movable gear. This structure does not ensure stable teeth engagement between the gears. However, according to one exemplary embodiment of the present disclosure, since the second gear 120 moves up and down in the vertical direction, all gear teeth may be engaged or disengaged at the same time, and the first gear 110 and the second gear 120 may be stably engaged.

Also, in a state of being engaged with the first gear 110, the second gear 120 is axially supported on the lower tube 103. The second gear 120 engaged with the first gear 110 is supported on the lower tube 103 in a direction in which the steering column is collapsed. The second gear 120 is inserted into a communication hole 105 forming communication between the first receiving part 103a and the second receiving part 104a and is axially supported on the lower tube 103. The second gear 120 is in surface contact with the lower tube 103. Accordingly, when the collapsing of the steering column is performed by an external force, the lower tube 103 supports the external force transferred from the upper tube 102 to the second gear 120 via the first gear 110, and the external force causing the collapsing of the steering column is not transferred to the bolt 142. The conventional steering column has a problem in that the bolt is bent by the external force causing the collapsing and it is difficult to stably absorb the load. According to one exemplary embodiment of the present disclosure, the external force is not transferred to the bolt 142, and the second gear 120 is axially supported on the lower tube 103 and supports the load, thereby stably responding to the high load.

According to an embodiment, the second gear 120 may remain supported on the lower tube 103 when moved up or down by the locking part 140. In other words, the second gear 120 may not only be axially supported on the lower tube 103 in the state of being engaged with the first gear 110, but may also be continuously axially supported on the lower tube 103 while being moved up or down. The lower tube 103 is axially supported, so that the ascent or descent of the second gear 120 is guided. More specifically, the second gear 120 may be inserted into the communication hole 105 formed in the lower tube 103 to be supported on the lower tube 103 on two opposite sides in the axial direction, and may be moved up or down while being supported by the lower tube 103 on two opposite sides in the axial direction.

Referring to FIGS. 3A, 3B and 4, a first receiving part 103a and a second receiving part 104a are formed in the lower tube 103. The first gear 110 may be received in the first receiving part 103a, and the coupling bracket 112 for coupling the first gear 110 to the upper tube 102 and the bending plate 111 may also be received in the first receiving part 103a. The second gear 120 may be received in the second receiving part 104a, and the swing cam 144 coupled to the bolt 142 to move up or down the second gear 120 and the elastic member 130 may be received.

According to an embodiment, the steering device 100 of the vehicle according to one exemplary embodiment of the present disclosure may further include an elastic member 130 for providing an elastic force to the second gear 120 in a direction in which the second gear 120 is engaged with the first gear 110. The elastic member 130 may be received in the second receiving part 104a and supported on an upper surface of the second gear 120 to provide an elastic force to the second gear 120 in a direction (−z direction) in which the elastic member 130 is engaged with the first gear 110. The elastic member 130 is compressed while the second gear 120 is moved up or down by the locking part 140, and the second gear 120 is moved down under the elastic force of the elastic member 130.

The elastic member 130 may provide an elastic force to the second gear 120 even when the second gear 120 is engaged with the first gear 110. In other words, the elastic member 130 may provide pre-pressure to the second gear 120. The first gear 110 and the second gear 120 are stably engaged and maintained by the pre-pressure provided by the elastic member 130, and noise and dust-proof performance is enhanced.

Referring to FIG. 1, the locking part 140 includes a lever 141, a movable cam 143a rotated by manipulation of the lever 141, and a fixed cam 143b engaged with the movable cam 143a. The lever 141 is coupled to the bolt 142, and the bolt 142 is rotated by manipulation of the lever 141, and the movable cam 143a coupled to one end of the bolt 142 is rotated. The fixed cam 143b is coupled to the plate bracket 107 and fixed in the rotational direction. A first end of the swing cam 144 is coupled to the bolt 142, and the swing cam 144 is rotated together with the bolt 142. At least a portion of a second end of the swing cam 144 overlaps at least a portion of the second gear 120 in a direction in which the second gear 120 moves up, which is described below. The second gear 120 may be moved up by the rotation of the swing cam 144 and moved down by the elastic force of the elastic member 130.

Referring to FIGS. 4 to 6, according to an embodiment, in the state in which the second gear 120 is engaged with the first gear 110, the second gear 120 may be moved up to be disengaged from the first gear 110 after the movable cam 143a is rotated a predetermined angle by manipulation of the lever 141 in the unlocking direction. In other words, the second gear 120 may be moved up after the lever 141 is manipulated by a predetermined initial rotation amount in the unlocking direction, rather than being moved up at the same time as the lever 141 is manipulated in the unlocking direction.

FIG. 4 illustrates a locked state, and FIG. 5 illustrates a state in which the lever 141 is manipulated by a predetermined initial rotation amount in the unlocking direction. In FIG. 5, the bolt 142 is rotated a predetermined angle by manipulation of the lever 141, but the second gear 120 remains engaged with the first gear 110 without being moved. FIG. 6 illustrates a state in which the lever 141 is further rotated in the unlocking direction than in the state of FIG. 5, and the second gear 120 is moved up to disengage from the first gear 110.

In other words, after the driver manipulates the lever 141 by a predetermined initial rotation amount, the steering column is switched to the unlocked state. By adjusting the amount of manipulation of the lever 141 for unlocking the steering column, the driver's sense of manipulation of the lever may be enhanced. Further, by adjusting the ratio of the initial rotation amount to the total lever operation amount, the height at which the second gear 120 is disengaged from the first gear 110 may be adjusted according to the size of the gear. The initial rotation amount of the lever 141 may be set from the coupling structure of the swing cam 144 and the bolt 142, which is described below.

A steering device 100 of a vehicle according to one exemplary embodiment of the present disclosure includes an upper tube 102, a first gear 110 fixed to the upper tube 102, a lower tube 103 receiving the upper tube 102 and having a distance bracket 104, a second gear 120 axially supported on the lower tube 103, and a locking part 140 including a lever 141, a bolt 142 coupled with the lever 141 and passing through the distance bracket 104, and a swing cam 144 having a first end coupled to the bolt 142 and a second end overlapping at least a portion of the second gear 120 in a direction in which the second gear 120 moves up. The same features as those of the above-described embodiments will be briefly described, and the description focuses primarily on differences.

Referring to FIGS. 1 to 4, the lower tube 103 is provided with the distance bracket 104, and the bolt 142 of the locking part 140 passes through the distance bracket 104 and is coupled to the lower tube 103. The lever 141 is coupled to the one end of the bolt 142, and the bolt 142 is rotated by the driver's manipulation of the lever 141. The swing cam 144 is coupled to the bolt 142 and, by rotation of the bolt 142, the swing cam 144 moves up the second gear 120 engaged with the first gear 110, and the second gear 120 is disengaged from the first gear 110.

The second gear 120 may be axially supported on the lower tube 103, and thus the lower tube 103 may be supported by an external impact that causes collapsing and may stably support a high load.

As the second gear 120 is vertically moved up or down and engaged with the first gear 110, the gap between gear teeth may be further narrowed and the number of gears to be engaged may be increased, providing strong teeth engagement and an advantage in light of high loads.

The first end of the swing cam 144 is coupled to the bolt 142 and rotated together with the bolt 142. According to an embodiment, the swing cam 144 may be rotated together with the bolt 142 after the lever 141 is rotated by a predetermined initial rotation amount. The second end of the swing cam 144 may be supported by the second gear 120 as the swing cam 144 is rotated. In other words, when the lever 141 is rotated in the unlocking direction, the second end of the swing cam 144 may be supported by the second gear 120 and the second gear 120 may be moved up. The second end of the swing cam 144 overlaps at least a portion of the second gear 120 in a direction in which the second gear 120 moves up. In other words, the second end of the swing cam 144 overlaps at least a portion of the second gear 120 in the z direction.

The second end of the swing cam 144 may be positioned lower than at least a portion of the second gear 120 in the z direction, and when the lever 141 is manipulated in the unlocking direction, the second end of the swing cam 144 may be supported by the second gear 120 from the lower side in the z direction, and thus the second gear 120 may be moved up in the z direction. Since the swing cam 144 is rotated with respect to the first end coupled to the bolt 142, when the swing cam 144 is rotated, the second end of the swing cam 144 has a range of operation in the y direction as well as the z direction, and the second end of the swing cam 144 is formed not to interfere with the movement of the second gear 120 that is moved up or down only in the z direction. As is described below in detail, the second end of the swing cam 144 may overlap the protrusion 710 of the second gear 120 in the z direction. Alternatively, the second end of the swing cam 144 may be inserted into the insertion recess 811 of the second gear 120 and may overlap the second gear 120 in the z direction.

According to an embodiment, a first receiving part 103a for receiving the first gear 110 may be formed in the lower tube 103. The first gear 110 is coupled to the outer circumferential surface of the upper tube 102, and the first receiving part 103a for receiving the first gear 110 may be formed in the lower tube 103 receiving the upper tube 102.

According to an embodiment, the coupling bracket 112 to which one end of the bending plate 111 is coupled may be coupled to the upper tube 102, and the first gear 110 may be coupled to the coupling bracket 112. The bending plate 111 protects the driver by absorbing the load when an external impact occurs, and the one end of the bending plate 111 is coupled to the coupling bracket 112. The coupling bracket 112 is fixed to the outer circumferential surface of the upper tube 102, and the first gear 110 and the bending plate 111 are coupled to the upper tube 102 via the coupling bracket 112. According to an embodiment, the first receiving part 103a may receive the first gear 110 and the coupling bracket 112. In the first receiving part 103a, the first gear 110 and the coupling bracket 112 are provided to be movable together with the axial movement of the upper tube 102.

According to an embodiment, a second receiving part 104a for receiving the second gear 120 and the swing cam 144 is formed in the distance bracket 104. In the second receiving part 104a, the second gear 120 may be provided to be moved up or down, and the swing cam 144 may be provided to be rotated with respect to the first end coupled to the bolt 142.

According to an embodiment, the lower tube 103 may have a communication hole 105 through which the first receiving part 103a and the second receiving part 104a communicate with each other, and the second gear 120 may be inserted into the communication hole 105. The second gear 120 is inserted into the communication hole 105 and is axially supported on the lower tube 103. The second gear 120 may be moved up or down while being inserted into the communication hole 105. In other words, the second gear 120 may be moved up or down while remaining axially supported on the lower tube 103.

According to an embodiment, the communication hole 105 may be formed in a direction perpendicular to the axial direction. In other words, the communication hole 105 may be formed in the z direction, and the vertical upward and downward movement of the second gear 120 may be guided by the communication hole 105.

According to an embodiment, the second receiving part 104a may be provided with an elastic member 130 having one end supported on the lower tube 103 and the other end supported on the second gear 120. The elastic member 130 may be supported on the upper surface of the second gear 120 and may provide an elastic force in the −z direction. Accordingly, the second gear 120 may be moved up in the z direction by the rotation of the swing cam 144 when the lever 141 is rotated in the unlocking direction, and may be moved down in the −z direction by the elastic force of the elastic member 130 when the lever 141 is rotated in the locking direction. According to an embodiment, the elastic member 130 may provide pre-pressure to the second gear 120 engaged with the first gear 110, thereby enhancing noise performance and dust-proof performance.

As described above, the second end of the swing cam 144 overlaps at least a portion of the second gear 120 in a direction in which the second gear 120 moves up to elevate the second gear 120. Referring to FIGS. 7A and 7B, according to an embodiment, the second gear 120 may have a protrusion 710 formed in the width direction of the second gear 120, and the second end of the swing cam 144 may overlap the protrusion 710 in the direction in which the second gear 120 moves up. The protrusion 710 may protrude laterally from the side surface of the second gear 120, and the second end of the swing cam 144 may be supported on the lower surface of the protrusion 710 to move up the second gear 120. As illustrated in the drawings, a pair of protrusions 710 may be provided on two opposite side surfaces of the second gear 120 in the width direction, and the second end of the swing cam 144 may be supported on the protrusions 710.

According to an embodiment, the second end of the swing cam 144 may include a first stopper 721 overlapping the protrusion 710 in a direction in which the second gear 120 moves up. The first stopper 721 is positioned below the protrusion portion 710 and is supported on the lower surface of the protrusion portion 710 when the swing cam 144 is rotated. The first stopper 721 is supported on the lower surface of the protrusion 710, and the second gear 120 is moved up. The protrusion 710 of the second gear 120 that is moved up or down by the elastic force of the elastic member 130 may remain supported by the first stopper 721.

According to an embodiment, the second end of the swing cam 144 may include a second stopper 722 overlapping the protrusion 710 in a direction in which the second gear 120 moves down. The second stopper 722 is positioned opposite to the first stopper 721 with the protrusion 710 positioned therebetween. The first stopper 721 and the second stopper 722 form a hole in which the protrusion 710 is positioned therebetween, and the first stopper 721 and the second stopper 722 facilitate assembly of the second gear 120 and the swing cam 144 to the second receiving part 104a.

According to an embodiment, an insertion recess 811 into which the second end of the swing cam 144 is inserted may be formed in the second gear 120. The insertion recess 811 is opened toward the swing cam 144, and the second end of the swing cam 144 is inserted into the insertion recess 811. The second end of the swing cam 144 inserted into the insertion recess 811 overlaps the body of the second gear 120 in a direction in which the second gear 120 moves up. Accordingly, the second gear 120 is moved up while the second end of the swing cam 144 is inserted in the insertion recess 811 and supported. The second gear 120 moved up or down by the elastic force of the elastic member 130 may remain supported by the second end of the swing cam 144 inserted into the insertion recess 811.

Referring to FIGS. 9A, 9B, and 9C, according to an embodiment, the swing cam 144 may be supported on the bolt 142 in the circumferential direction at the first rotation position with respect to the bolt 142 or may be supported on the bolt 142 in the circumferential direction at the second rotation position. In other words, the swing cam 144 has a range of operation by an angle between the first rotation position and the second rotation position with respect to the bolt 142. FIG. 9A illustrates a state in which the swing cam 144 is positioned at the first rotation position and is supported on the bolt 142 in the circumferential direction, and FIG. 9B illustrates a state in which the swing cam 144 is positioned at the second rotation position and the bolt 142 is supported in the circumferential direction. The swing cam 144 is positioned at the first rotation position, and the second gear 120 is engaged with the first gear 110 as illustrated in FIG. 4.

As illustrated in FIGS. 5 and 9B, if the driver manipulates the lever 141, the bolt 142 starts to rotate, but until the swing cam 144 is positioned at the second rotation position with respect to the bolt 142, the swing cam 144 does not rotate, but only the bolt 142 rotates, and the second gear 120 does not elevate and keeps engaging with the first gear 110. In other words, the angle between the first rotation position and the second rotation position corresponds to the initial rotation amount by which the driver needs to manipulate the lever 141 to switch from the locked state to the unlocked state.

If the driver rotates the lever 141 up to the initial rotation amount, the position of the swing cam 144 relative to the bolt 142 reaches the second rotation position. Thereafter, as illustrated in FIGS. 6 and 9C, the swing cam 144 and the bolt 142 are rotated together, so that the second gear 120 is moved up to disengage from the first gear 110, unlocking the steering column.

If the driver manipulates the lever 141 in the locking direction again, the swing cam 144 starts to rotate together with the bolt 142 by the elastic force of the elastic member 130. Thereafter, the second gear 120 and the first gear 110 are engaged with each other, the bolt 142 is further rotated, and the position of the swing cam 144 relative to the bolt 142 is switched from the second rotation position to the first rotation position.

According to an embodiment, the outer circumferential surface of the bolt 142 may have a first chamfered portion 911, a coupling hole 144a to which the bolt 142 is inserted may be formed in the first end of the swing cam 144, and the inner circumferential surface of the coupling hole 144a may have a second chamfered portion 912 supported on the first chamfered portion 911 at the first rotation position and a third chamfered portion 913 supported on the first chamfered portion 911 at the second rotation position. In other words, the first chamfered portion 911 of the bolt 142 is supported on the second chamfered portion 912 or the third chamfered portion 913 formed on the inner circumferential surface of the coupling hole 144a of the swing cam 144. As shown in FIG. 9A, the first chamfered portion 911 and the second chamfered portion 912 are mutually supported at the first rotation position. As shown in FIG. 9B and FIG. 9C, the first chamfered portion 911 and the third chamfered portion 913 are mutually supported at the second rotation position. The angle between the second chamfered portion 912 and the third chamfered portion 913 corresponds to the initial rotation amount from when the driver starts to manipulate the lever 141 in the unlocking direction to when the second gear 120 is disengaged from the first gear 110.

By the so-shaped vehicle steering device, it is possible to provide an advantage in terms of a high load thanks to increased support against an axial external force and allow for stable engagement between gear teeth, enhanced noise and dust-proof performance, and an enhanced sense of lever manipulation.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A steering device of a vehicle, comprising:
an upper tube;
a first gear fixed to the upper tube;
a lower tube receiving the upper tube;
a second gear axially supported on the lower tube; and
a locking part configured to move the second gear up or down to engage the second gear with the first gear or disengage the second gear from the first gear,
wherein the second gear is engaged with the first gear inside the lower tube,
wherein the first end of the swing cam is circumferentially supported on the bolt at a first rotation position or a second rotation position about the bolt,
wherein an outer circumferential surface of the bolt has a first chamfered portion,
wherein the first end of the swing cam has a coupling hole to which the bolt is inserted,
wherein an inner circumferential surface of the coupling hole has a second chamfered portion supported on one part of the first chamfered portion at the first rotation position and a third chamfered portion supported on an other part of the first chamfered portion at the second rotation position, and
wherein the second chamfered portion and the third chamfered portion are in contact with each other at an angle.

2. The steering device of claim 1, wherein the second gear is moved down in a first direction perpendicular to an axial direction and facing the first gear, and is moved up in a second direction opposite to the first direction.

3. The steering device of claim 1, wherein the second gear remains axially supported on the lower tube when moved up or down by the locking part.

4. The steering device of claim 1, further comprising an elastic member providing the second gear with an elastic force in a direction of teeth engagement with the first gear.

5. The steering device of claim 1, wherein the locking part includes a lever, a movable cam rotated by manipulation of the lever, and a fixed cam engaged with the movable cam,
wherein the second gear is moved up to be disengaged from the first gear after the movable cam is rotated a predetermined angle by manipulation of the lever in an unlocking direction during teeth engagement with the first gear.

6. A steering device of a vehicle, comprising:
an upper tube;
a first gear fixed to the upper tube;
a lower tube receiving the upper tube and having a distance bracket;
a second gear axially supported on the lower tube; and
a locking part including a lever, a bolt coupled with the lever and passing through the distance bracket, and a swing cam having a first end coupled to the bolt and a second end overlapping at least a portion of the second gear in a direction in which the second gear moves up,
wherein the second gear is engaged with the first gear inside the lower tube,
wherein the first end of the swing cam is circumferentially supported on the bolt at a first rotation position or a second rotation position about the bolt,
wherein an outer circumferential surface of the bolt has a first chamfered portion,
wherein the first end of the swing cam has a coupling hole to which the bolt is inserted,
wherein an inner circumferential surface of the coupling hole has a second chamfered portion supported on one part of the first chamfered portion at the first rotation position and a third chamfered portion supported on an other part of the first chamfered portion at the second rotation position, and
wherein the second chamfered portion and the third chamfered portion are in contact with each other at an angle.

7. The steering device of claim 6, wherein the lower tube has a first receiving part receiving the first gear.

8. The steering device of claim 7, wherein the upper tube is coupled with a coupling bracket coupled with an end of a bending plate, and the first gear is coupled to the coupling bracket.

9. The steering device of claim 8, wherein the first receiving part is configured to receive the first gear and the coupling bracket.

10. The steering device of claim 7, wherein the distance bracket has a second receiving part receiving the second gear and the swing cam.

11. The steering device of claim 10, wherein the lower tube has a communication hole through which the first receiving part and the second receiving part communicate with each other, and wherein the second gear is inserted into the communication hole.

12. The steering device of claim 11, wherein the communication hole is formed in a direction perpendicular to an axial direction.

13. The steering device of claim 11, wherein the second receiving part includes an elastic member having a first end supported on the lower tube and a second end supported on the second gear.

14. The steering device of claim 6, wherein the second gear has a protrusion extending in a width direction of the second gear, and
   wherein the second end of the swing cam overlaps the protrusion in the direction in which the second gear moves up.

15. The steering device of claim 14, wherein the second end of the swing cam includes a stopper overlapping the protrusion in the direction in which the second gear moves up.

16. The steering device of claim 14, wherein the second end of the swing cam includes a stopper overlapping the protrusion in a direction in which the second gear moves down.

17. The steering device of claim 6, wherein the angle between the second chamfered portion and the third chamfered portion corresponds to an initial rotation amount from when a driver starts to manipulate the lever in an unlocking direction to when the second gear is disengaged from the first gear.

18. A steering device of a vehicle, comprising:
   an upper tube;
   a first gear fixed to the upper tube;
   a lower tube receiving the upper tube and having a distance bracket;
   a second gear axially supported on the lower tube; and
   a locking part including a lever, a bolt coupled with the lever and passing through the distance bracket, and a swing cam having a first end coupled to the bolt and a second end overlapping at least a portion of the second gear in a direction in which the second gear moves up,
   wherein the second end of the swing cam is inserted into an insertion recess of the second gear.

19. The steering device of claim 18, wherein the insertion recess is opened toward the swing cam, and the second end of the swing cam inserted into the insertion recess overlaps a body of the second gear.

* * * * *